Patented Oct. 12, 1937

2,095,366

UNITED STATES PATENT OFFICE 2,095,366

INSECTICIDAL PHOSPHATE FERTILIZER

Sisto E. Marsico, Aspinwall, Pa.

No Drawing. Application August 9, 1935,
Serial No. 35,529

1 Claim. (Cl. 71—3)

This invention relates to an improved plant food or fertilizer adapted for general use for improving soil so as to promote the growth of plants and other vegetation.

An object of the present invention is to produce a fertilizer that will supply the elements ordinarily poor in soils, and that is composed of active ingredients including a comparatively large percentage of calcium phosphate and sufficient copper sulphate to act as an insecticide and convert considerable of the calcium phosphate to a form which will be readily dissolved by moisture for rapidly penetrating and disseminating through the soil.

A further important object of the present invention is to provide a fertilizer of the above character in which the copper sulphate is used in such proportions and with such other ingredients as to provide the fertilizer with pronounced insectifugal, germicidal, and fungicidal qualities, although having no detrimental effect on vegetation.

A fertilizer composition which I have found most effective consists of the following ingredients in approximately the proportions named:

| | Per cent |
|---|---|
| Humus (unspent) | about 40 |
| Bone meal | do 35 |
| Dry blood | do 20 |
| Copper sulphate | do 5 |

The bone meal and dry blood of course furnish most of the food elements, such as phosphorus, nitrogen, etc. While the humus has some food value, it is used primarily to provide bulk in a desirable form calculated to loosen the soil, in addition to providing a considerable volume of base or body material throughout which the remaining ingredients, particularly the copper sulphate, will be considerably scattered. This is particularly important in order that it may be practical to employ the comparatively large percentage of copper sulphate, without having a detrimental effect upon the plants and vegetation. Of course, the proportions of the several ingredients may be varied somewhat without material change in the results. For instance, a composition which gave good results had the following analysis:

| | Per cent |
|---|---|
| Moisture | 6.42 |
| Nitrogen | 4.10 |
| Copper sulphate | 6.09 |
| Organic carbon | 21.07 |
| Penta-oxide of phosphorus | 9.13 |
| Calcium phosphate (unavailable) | 19.90 |
| Inert matter | 33.29 |

From the above analysis, it will be seen that a fertilizer composition embodying the present invention contains approximately 20% of phosphorus in the form of unavailable calcium phosphate accompanied by approximately 5% or 6% of copper sulphate. A sample of the present fertilizer having a penta-oxide of phosphorous content of 8.84% and containing the copper sulphate was placed in water in the proportions of 50 grams of fertilizer and 500 c. c. of distilled water for a period of 24 hours, after which the solution was filtered and the filtrate was analyzed with the result that the filtrate was found to contain 84.71 parts per million of penta-oxide of phosphorus. A similar test was made in connection with a fertilizer of the same composition except that the copper sulphate was omitted and the normal penta-oxide of phosphorous content of the composition was 9.35%, with the result that an analysis of the filtrate showed the same to contain only 61.38 parts per million of penta-oxide of phosphorus. It may therefore be assumed that when the copper sulphate is used much of the calcium phosphate is rendered more readily available when the present composition is solutioned by moisture, thereby providing a greatly increased percentage of phosphorus in a form which will more readily pentrate and disseminate through the soil. The latter statement will be better appreciated from the fact that the rate of filtration of the sample containing copper sulphate was rapid, while the rate of filtration of the sample without copper sulphate was slow.

It will of course be understood that the present fertilizer composition is normally in a fine granular or powdered form adapted to be spread in any suitable manner over the surface of the soil. Also, ingredients are used which are comparatively inexpensive and readily available for providing this kind of composition having the required food and other elements.

It is of course broadly old to employ copper sulphate as an ingredient of a fertilizer composition and as a means to correct certain soil conditions through its germicidal, insecticidal, and fungicidal properties. I am aware of no prior use, however, of copper sulphate in the comparatively large percentage proposed by me and in connection with active ingredients containing a relatively large percentage of phosphorus in the form of calcium phosphate, whereby considerable of said calcium phosphate is rendered more readily available to penetrate and disseminate through the soil upon moistening of the composition. With prior fertilizers containing sulphate of copper, the latter had to be of a much smaller percentage to avoid detrimental action upon the plants and vegetation, etc. Also, there was no contemplation of utilizing copper sulphate in the presence of a comparatively large percentage of calcium phosphate so that said copper sulphate would perform the dual function contemplated by the present invention. Another desirable advantage in my use of a relatively large percentage of copper sulphate as an ingredient of the present fertilizer, is that it aids in causing the composition to remain where it falls upon the ground, said copper sulphate having a somewhat adhesive or sticky nature.

From the foregoing description, it is believed that the advantages and novelty of the present invention will be readily appreciated by those skilled in the art.

Having described my invention, what I claim as new is:

An insecticidal plant food containing phosphatic values and comprising approximately 40% unspent humus, 35% bone meal, 20% dry blood, and 5% copper sulphate, the latter acting as an insecticide and contributing to cause an increase in the available phosphate content when the composition is exposed to moisture.

SISTO E. MARSICO.